United States Patent
Kevenaar et al.

(10) Patent No.: US 7,586,910 B2
(45) Date of Patent: Sep. 8, 2009

(54) OVERHEAD REDUCTION AND ADDRESS AND PROTECTION IN COMMUNICATION STACK

(75) Inventors: Thomas Andreas Maria Kevenaar, Eindhoven (NL); Franciscus Lucas Antonius Johannes Kamperman, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 588 days.

(21) Appl. No.: 10/553,920

(22) PCT Filed: Apr. 23, 2004

(86) PCT No.: PCT/IB2004/050500

§ 371 (c)(1),
(2), (4) Date: Oct. 20, 2005

(87) PCT Pub. No.: WO2004/098155

PCT Pub. Date: Nov. 11, 2004

(65) Prior Publication Data

US 2007/0115977 A1     May 24, 2007

(30) Foreign Application Priority Data

Apr. 25, 2003    (EP)   .................... 03101150

(51) Int. Cl.
*G06F 15/16*    (2006.01)
(52) U.S. Cl. ..................... 370/389; 370/392
(58) Field of Classification Search ................ 370/389, 370/392
See application file for complete search history.

(56) References Cited

U.S. PATENT DOCUMENTS

| | | | |
|---|---|---|---|
| 5,627,829 A | | 5/1997 | Gleeson et al. |
| 6,070,198 A | * | 5/2000 | Krause et al. ............... 719/321 |
| 6,856,591 B1 | * | 2/2005 | Ma et al. ..................... 370/216 |
| 7,028,182 B1 | * | 4/2006 | Killcommons .............. 713/161 |
| 7,133,930 B2 | * | 11/2006 | Munger et al. .............. 709/245 |
| 7,149,219 B2 | * | 12/2006 | Donahue .................... 370/392 |

OTHER PUBLICATIONS

Alfred J. Menezes, et al, "Handbook of Applied Cryptography", CRC Press, p. 353, 1997.

* cited by examiner

*Primary Examiner*—Daniel J Ryman
*Assistant Examiner*—Jay P Patel

(57) ABSTRACT

The invention reduces addressing overhead for communication using a layered communication protocol. An improvement of the invention maintains security for the addressing information.

13 Claims, 7 Drawing Sheets

OVERHEAD REDUCTION AND ADDRESS AND PROTECTION IN COMMUNICATION STACK

The invention relates to a transmitting method of transmitting data using a layered communication model, comprising the steps of generating at a first layer a first communication fragment comprising a first address reference referring to a first entity, generating at a second layer below the first layer a second communication fragment based on the first communication fragment and further comprising a second address reference referring to a second entity which is related to the first entity, and transmitting data comprising the second communication fragment.

The invention also relates to a receiving method of receiving data using a layered communication model, comprising the step of receiving data comprising a second communication fragment, the second communication fragment comprising a second address reference referring to a second entity which is related to a first entity, being based on a first communication fragment comprising a first address reference to the first entity, and retrieving the first communication fragment from the second communication fragment.

The invention further relates to a system for communication using a layered communication model, the system comprising transmitter means being arranged to generate at a first layer a first communication fragment comprising a first address reference referring to a first entity, and further being arranged to generate at a second layer below the first layer a second communication fragment based on the first communication fragment and further comprising a second address reference referring to a second entity which is related to the first entity, communication means being arranged to transmit data comprising the second communication fragment, and receiving means being arranged to receive data comprising the second communication fragment, and further being arranged to retrieve the first communication fragment from the second communication fragment.

The invention further relates to a transmitter device for transmitting data using a layered communication model, the transmitter device being arranged to generate at a first layer a first communication fragment comprising a first address reference referring to a first entity, further being arranged to generate at a second layer below the first layer a second communication fragment based on the first communication fragment and further comprising a second address reference referring to a second entity which is related to the first entity, and further being arranged to transmit data comprising the second communication fragment.

The invention also relates to a receiver device for receiving data using a layered communication model, the receiver device being arranged to receive data comprising a second communication fragment, the second communication fragment comprising a second address reference referring to a second entity which is related to a first entity, being based on a first communication fragment comprising a first address reference to the first entity, and further being arranged to retrieve the first communication fragment from the second communication fragment.

The invention further relates to a signal for carrying data generated according to a layered communication model, the data being generated according to a layered communication model comprising a first layer in which a first communication fragment comprising a first address reference referring to a first entity is generated, and a second layer below the first layer in which a second communication fragment comprising a second address reference referring to a second entity related to the first entity and based on the first communication fragment is generated.

The invention further relates to a transmitter computer program product to implement communication using a layered communication model, the transmitter computer program product being arranged to generate at a first layer a first communication fragment comprising a first address reference referring to a first entity, further being arranged to generate at a second layer below the first layer a second communication fragment based on the first communication fragment and further comprising a second address reference referring to a second entity which is related to the first entity, and further being arranged to transmit data comprising the second communication fragment.

The invention also relates to a receiver computer program product to implement communication using a layered communication model, the receiver computer program product being arranged to receive data comprising a second communication fragment, the second communication fragment comprising a second address reference referring to a second entity which is related to a first entity, being based on a first communication fragment comprising a first address reference to the first entity, and further being arranged to retrieve the first communication fragment from the second communication fragment, a first layer in which a first communication fragment comprising a first address reference referring to a first entity is generated, and a second layer below the first layer in which a second communication fragment comprising a second address reference referring to a second entity related to the first entity and based on the first communication fragment is generated.

In communication protocols, it is common to use a layered model such as the OSI reference model. Such a model comprises a set of layers, each layer at a different abstraction level. Such a model may include from bottom to top: the physical layer (PHY), the medium access control layer (MAC), the network layer (NWK) and the application layer (APL). In general, a frame (a fragment of information exchanged between equal OSI layers on different devices) consists of a header and a payload. One or more frames at level n in the OSI stack are physically sent as the payload of one or several frames at the next lower layer n−1. The lowest level implements the physical communication, for example via a wired or wireless connection. In a general setting a single device might have a different address on the different layers of the OSI stack. Frames at different levels typically include each a source address, destination address, and sometimes hop address. This results in much overhead in the physical frame, which is transmitted at the lowest level, due to the multiple inclusion of address information. This presents the problem of too much overhead in constrained applications, such as communication protocols with a limited physical frame length, or in low-power applications.

It is an object of the current invention to provide a transmitting method, in which the size of the physical frame is reduced while substantially maintaining the contained information.

This object is realized by a transmitting method according to the invention that is characterized in that the transmitting method further comprises the step of removing at least partly the first address reference in the transmitted data.

Another embodiment addresses the protection of the first communication fragment of which the first address reference is omitted. A certain layer wanting to cryptographically protect its frames might generate a Message Integrity Code (MIC) for each frame. A MIC on an arbitrary string can be generated by using, for example, a block cipher in CBC-MAC mode (see Alfred J. Menezes, Paul C. van Oorschot, Scott A. Vanstone, Handbook of Applied Cryptography, p 353). In the case of frame protection, the input to the CBC-MAC will be the frame to be protected, possibly prefixed by a number indicating the length of the frame. After the MIC is determined it will be added to the frame payload before the frame is sent.

In some (constrained) implementations a lower layer assumes that a message that was initiated by a higher layer is also cryptographically protected by that higher layer and hence the lower layer will not perform any cryptographic operations on this message.

Using this approach based on the paradigm "the layer where the message is initiated takes care of cryptographic protection", the cryptographic overhead is reduced to a most one MIC per physical message. But this means that, in the example above, the higher layer cannot rely on the lower layer for cryptographic protection of the address reference that has been omitted in the higher layer and now only appears in the lower layer.

In this embodiment, the cryptographic protection of the first address reference is provided by computing a MIC before omitting the first address reference. As the duplicated information is no longer available in the higher layer, it is still included in the MIC and therefore protected. This embodiment therefore has the advantage that it maintains the cryptographic protection to include the address reference that has been omitted.

Another embodiment has the advantage that only at one level in the communication layer cryptographic protection is added, which reduces the overhead.

Another embodiment has the advantage that in an application where each message is typically short enough to fit in one frame (i.e. at each level the message is smaller than the maximum allowed payload), the overhead of adding a MIC is minimized by performing the operation at the highest level possible, which is the initiating level.

In another embodiment, the duplicated information to be omitted is replaced by a shorter field indicating where the omitting data can be found.

It is a further object of the current invention to provide a receiving method, in which the size of the physical frame is reduced while substantially maintaining the contained information.

This object is realized by a receiving method according to the invention that is characterized in that the first address reference is at least partly omitted in the received data, and the receiving method further comprises the step of restoring the first address reference in retrieving the first communication fragment.

The system according to the invention is characterized in that the transmitter means is arranged to at least partly omit the first address reference from the transmitted data, and the receiving means is arranged to restore the first address reference in retrieving the first communication fragment from the received data.

The transmitter device according to the invention is characterized in that the transmitter device is further arranged to remove at least partly the first address reference in the transmitted data.

The receiver device according to the invention is characterized in that the first address reference is at least partly omitted in the received data, and the receiver device is further arranged to restore the first address reference in retrieving the first communication fragment.

The signal according to the invention is characterized in that the signal carries the second communication fragment in which the first address reference is at least partly omitted.

The transmitter computer program product according to the invention is characterized in that the transmitter computer program product is further arranged to omit the first address reference in the transmitted data.

The receiver computer program product according to the invention is characterized in that the first address reference is at least partly omitted in the received data, and the receiver computer program product is further arranged to restore the first address reference in retrieving the first communication fragment These and other aspects of the invention will be further described by way of example and with reference to the drawing, in which.

Figure 5:
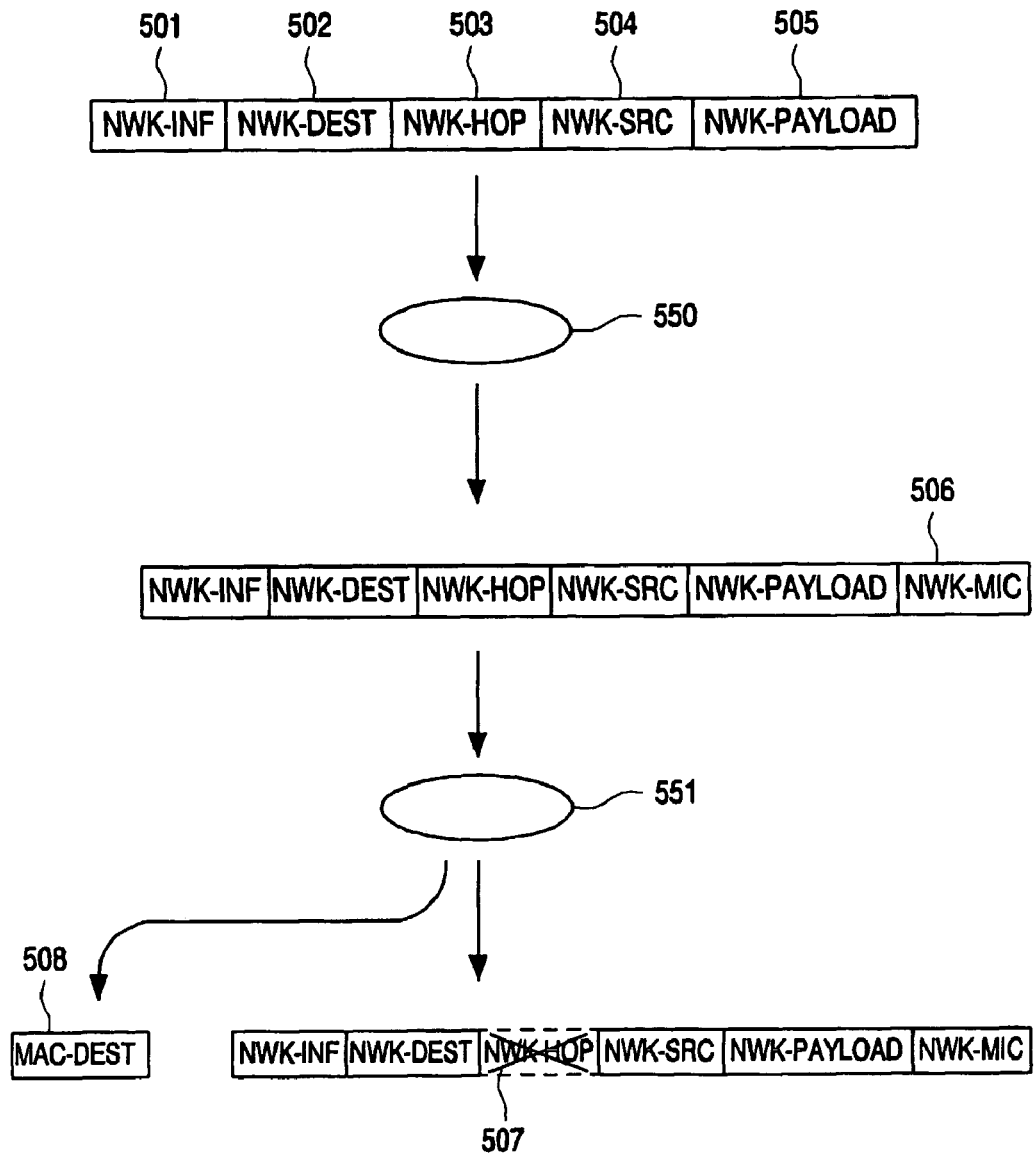
Figure 6:
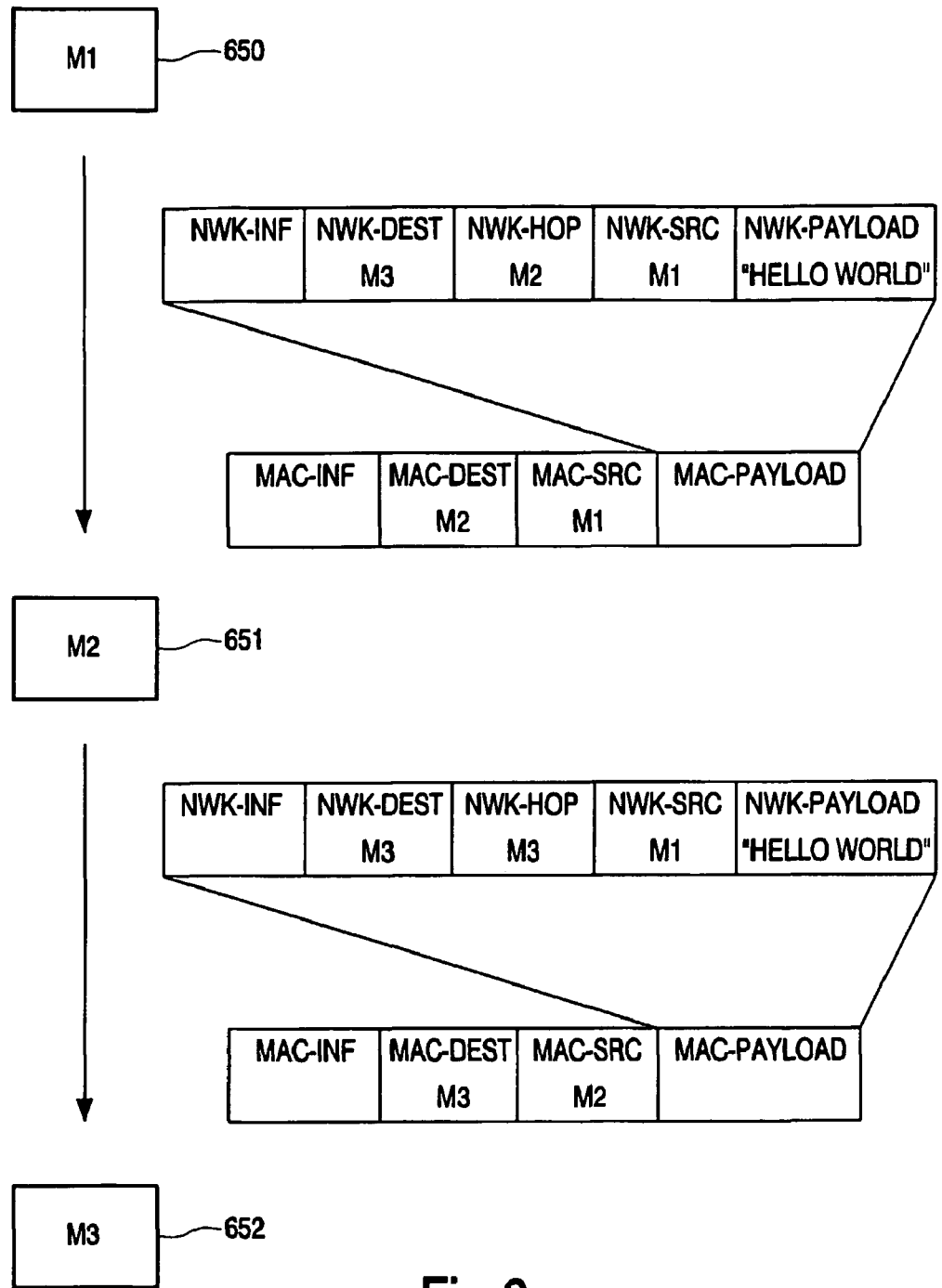
Figure 7:
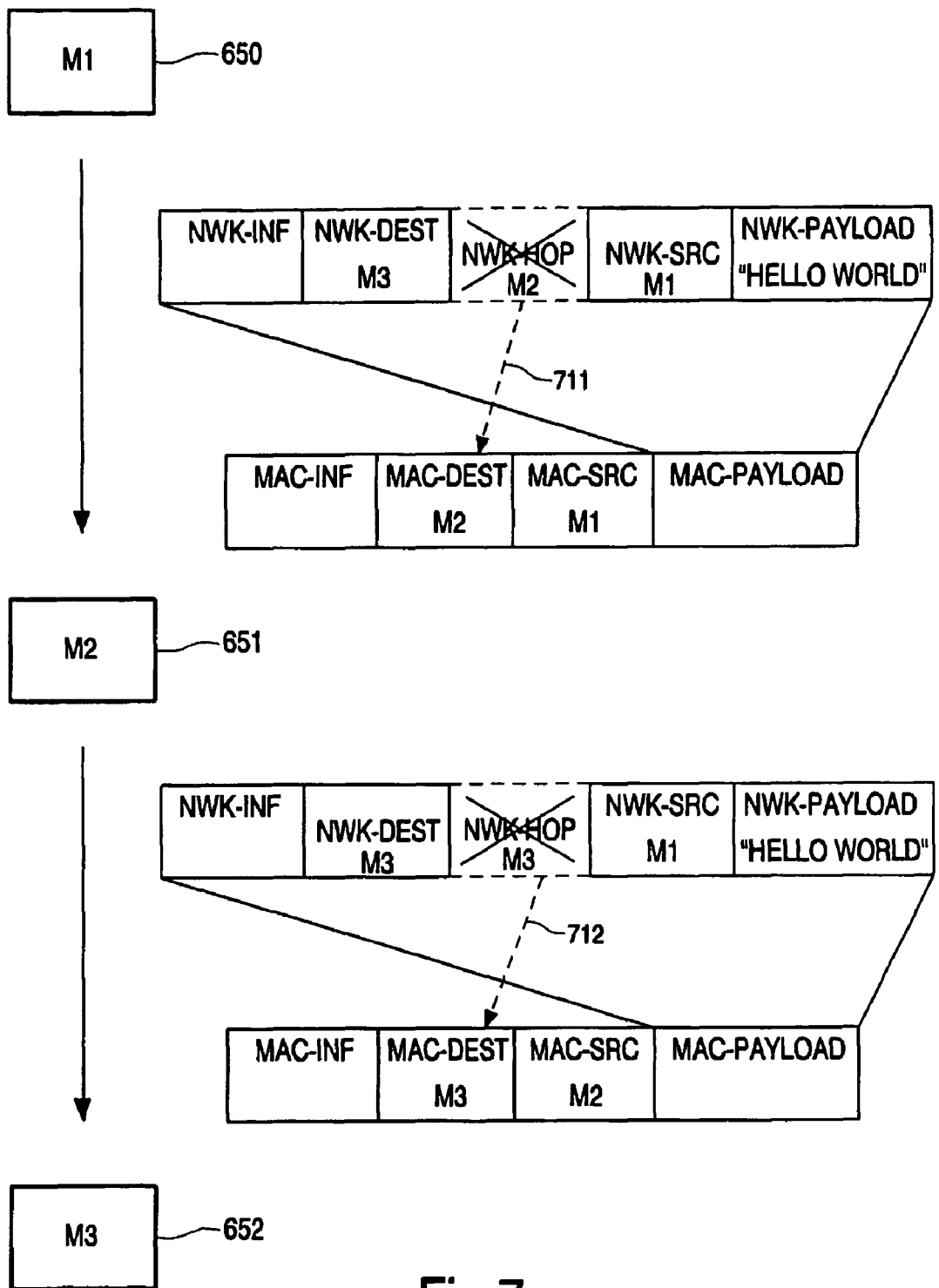
Figure 8:
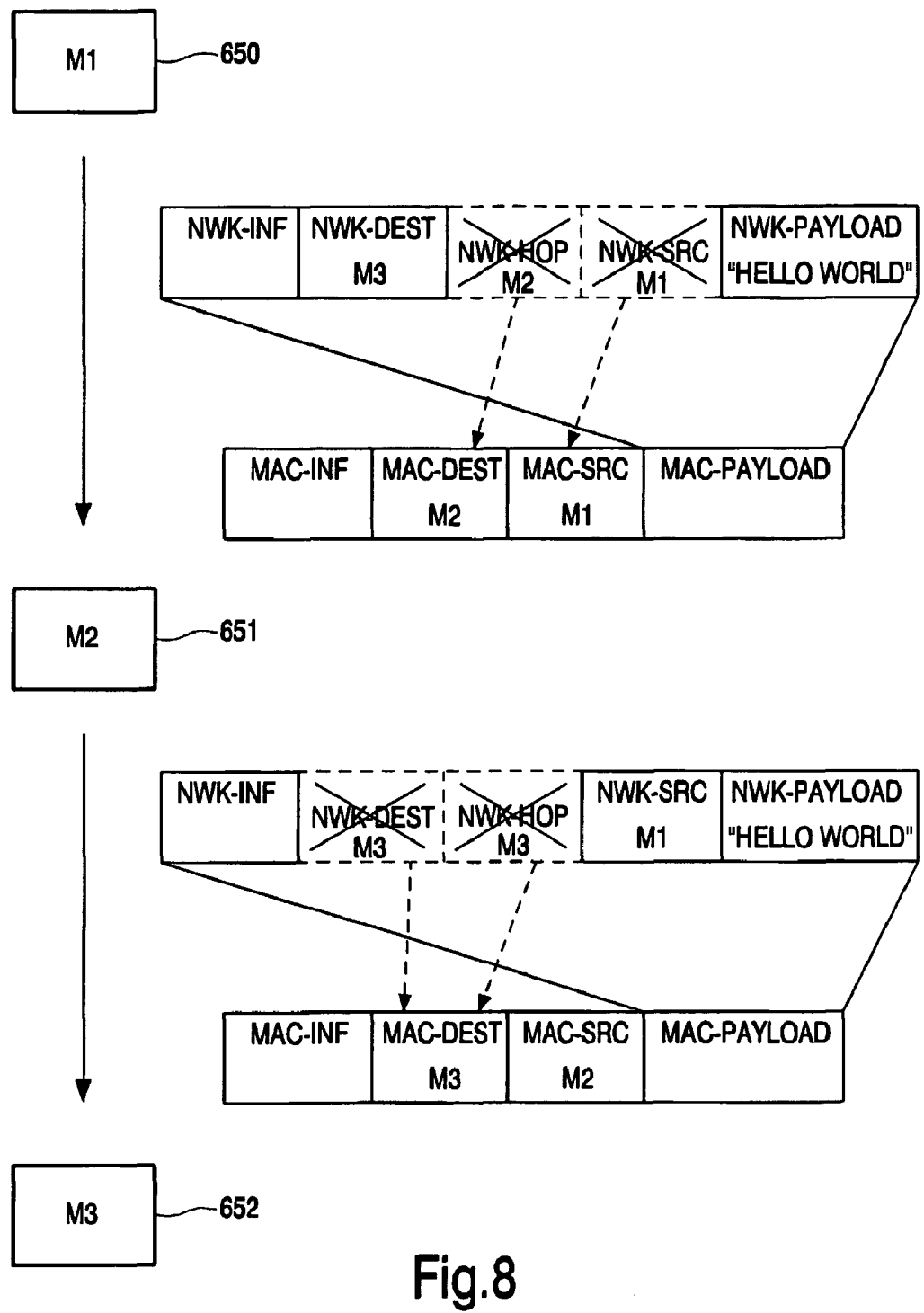
Figure 9:
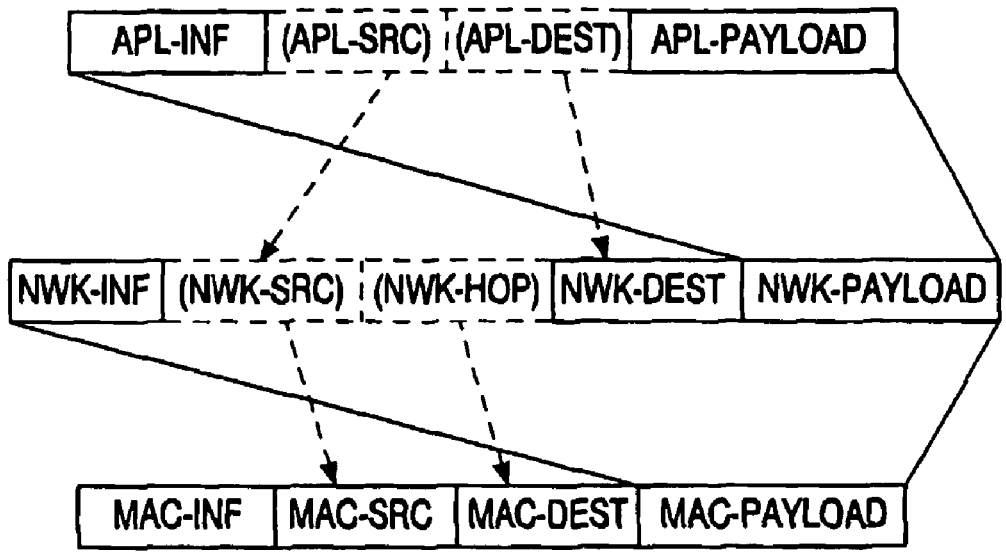
Figure 10:
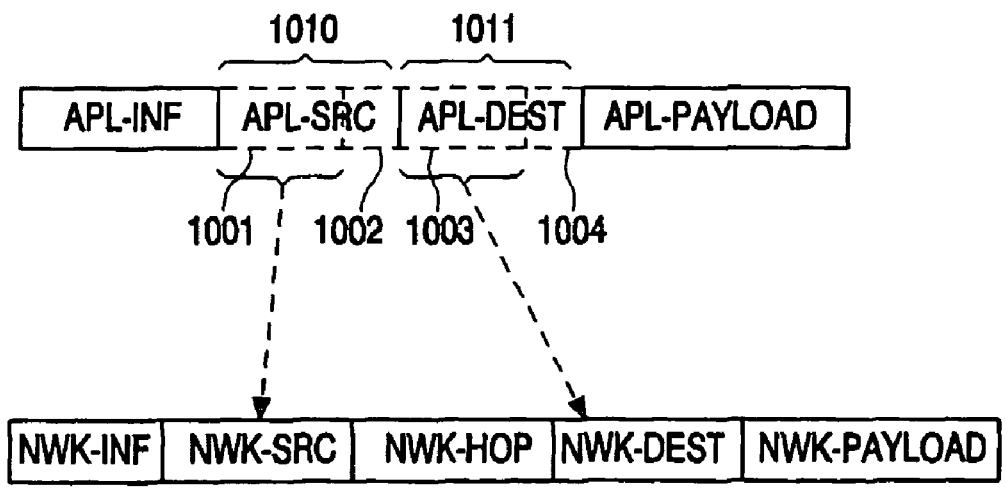

FIG. 5 shows the process of computing the MIC and omitting the duplicated data during frame generation, FIG. 6 shows a communication in a multi-hop setting, FIG. 7 shows the same communication using the invention, FIG. 8 shows and other embodiment of the same multi hop communication using the invention, FIG. 9 shows a recursive embodiment of the invention, and FIG. 10 shows an embodiment of the invention with sub-addressing at a higher layer.

Throughout the figures, same reference numerals indicate similar or corresponding features. Some of the features indicated in the drawings are typically implemented in software, and as such represent software entities, such as software modules or objects.

Figure 1:
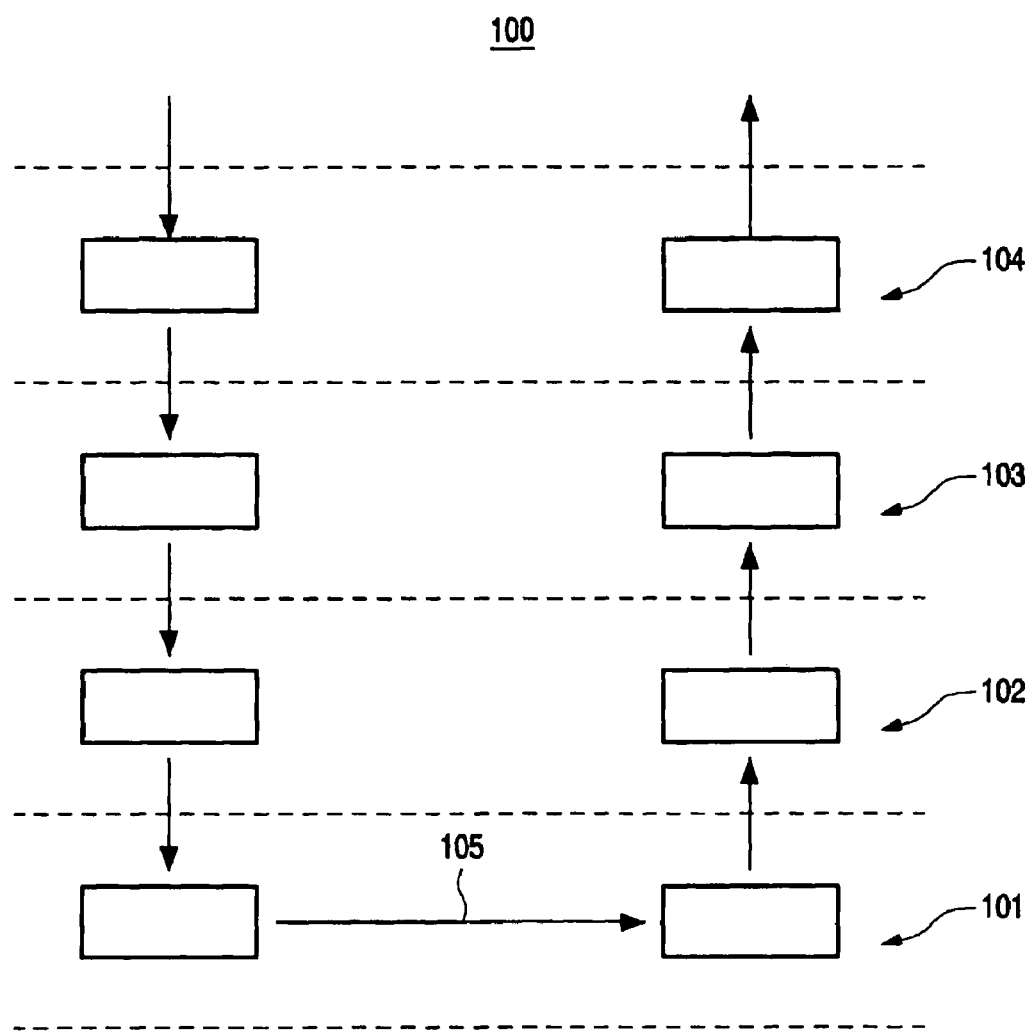
FIG. 1 illustrates an example layered communication model.

A first embodiment of the invention will be illustrated by the example shown in FIG. 1. FIG. 1 shows an example of a layered communication model 100, comprising the physical layer (PHY) 101, the medium access control layer (MAC) 102, the network layer (NWK) 103 and the application layer (APL) 104. Actual communication 105 takes place at the lowest level. In practice more layers can be used than shown here. Different communication channels can be used, including optical, electronic, and wireless technologies.

Figure 2:
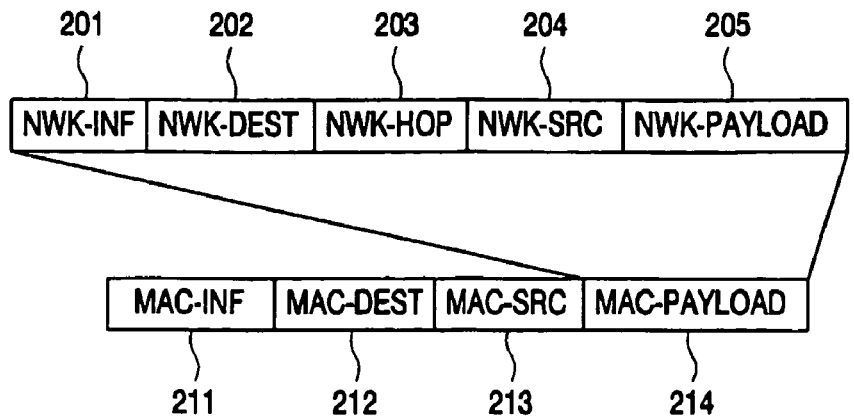
FIG. 2 shows a relation between a NWK frame and a MAC frame.

FIG. 2 presents an example of the relation between two frames at adjacent layers in the OSI stack, namely a NWK frame and a MAC frame, in a multi-hop setting. A message in a multi-hop network, for example originating at the NWK layer, might be relayed by one or more intermediate devices before arriving at its destination. The intermediate devices will apply some routing algorithm in order to determine to which device the message should be sent next. The address of the next intermediate device is indicated by the NWK-HOP address which is used by receiving devices to determine whether they are the next hop and should send the message onward.

The NWK frame header contains an information field (NWK-INF) 201 that gives information about, for example, the content of the rest of the frame. Further there is the NWK address of the device were the message originated (NWK-SRC) 204, its final destination (NWK-DEST) 202 and a payload (NWK-PAYLOAD) 205. In a multi-hop setting it will also contain the NWK address of the next hop (NWK-HOP) 203 such that a receiving device can determine if it should process the frame or discard it. The MAC layer will be used to send the NWK frame as payload (MAC-PAYLOAD 214)

from the current device to the next hop and hence it contains the MAC address of the current device (MAC-SRC) 213 and the MAC address of the next hop (MAC-DEST 212. In many cases the entries MAC-DEST and NWK-HOP will refer to the same physical device i.e. the addressing information is sent twice. In regular applications, addresses at different layers referring to the same device appear several times in a single physical frame. In the invention the duplicated address (in this example: NWK-HOP) entry is omitted from the NWK frame and the NWK layer relies on the corresponding entry (MAC-DEST) in the MAC layer.

If a layer initiates a message or generates a frame that contains information (such as an address) that will be duplicated in a lower layer, either directly or through some invertible mapping such as an address table look-up, the higher layer will omit the duplicated information and indicate in one of the fields (for example the NWK-INF field) which information is omitted and optionally where it can be retrieved from. A simple embodiment of how to indicate this is to define bits that indicate if a certain entry is omitted. Referring to FIG. 2 and assuming that at the NWK layer it is sometimes possible to omit NWK-DEST 202, NWK-HOP 203 and NWK-SRC 204, the NWK-INF 201 field would contain three bits, each referring to one of the address entries indicating which address entry is present (or omitted). Additional bits or implicit rules can be used to determine which fields in the lower layer are to be used. The initiating layer at the receiving end will read the bits in the NWK-INF field and obtain omitted addresses from the lower layers, directly or using the inverted mapping which in many cases will take the form of a table look-up.

Alternatively, instead of omitting a field, it could be replaced by a shorter field. This shorter field would then contain some kind of pointer or reference indicator that would give information where the omitted information can be found. Again, it would be possible to use a bit in for example the NWK-INF field to indicate whether a field has been replaced.

Alternatively, instead of adding a bit field to the NWK-INF field, a different technology to indicate that the omitted field is replaced by a short field can be used. If for example the valid value range of the omitted field is not used completely, but a reserved range starting with a special prefix is available, this special prefix could be used to indicate that the field has been replaced. Suppose that the field to be omitted is for rights, and has a valid value range of 0x00000000-0xefffff, then the prefix 0xf . . . could be used to indicate that the field has been replaced by a shorter field of for example only 2 bytes. The value of this field should then be in accordance with the prefix and hence be limited to the range 0xf000-0xffff.

The idea is especially of advantage in applications where the physical frame size of messages is limited. A typical example of such an application is a system of low-cost and/or low-power wireless connected devices, such as sensors, home-security, building automation, remote metering, toys, mice, key boards, etc. This method is even more beneficial if the addresses used at the different OSI layers are identical in which case no translation between addresses has to be done.

In a second embodiment of the invention, cryptographic protection is maintained for the addresses which have been omitted.

Figure 3:
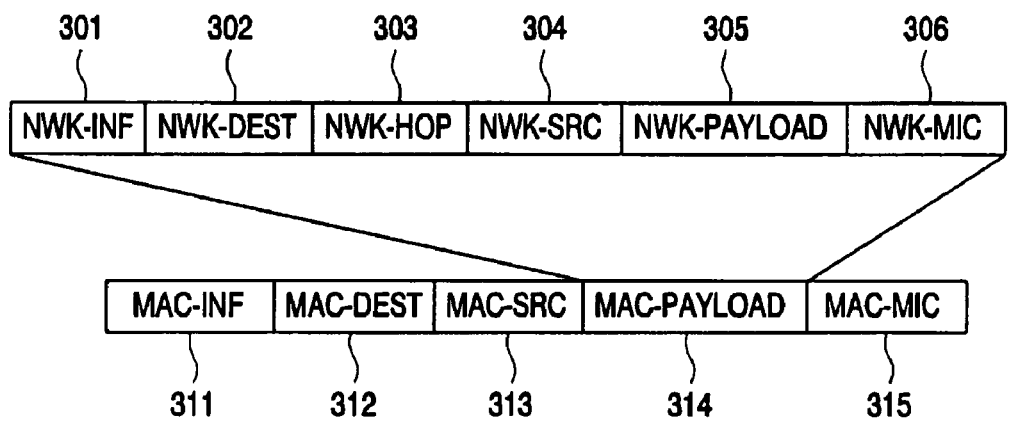
FIG. 3 shows the protection of frames using a MIC.

FIG. 3 illustrates the situation that a certain layer, such as the NWK layer, wants to cryptographically protect its frames by generating a Message Integrity Code (MIC) for each frame including the address information. In this case NWK-MIC 306 protects the complete NWK frame 301 . . . 305 while MAC-MIC 315 protects the complete MAC frame 311 . . . 314 including the NWK frame.

In an example system, a typical maximum size of a MAC frame could be 102 bytes and the size of a MIC could be defined as 4, 8 or 16 bytes. If there was a MIC at every layer of the OSI stack, there would be 12 to 48 MIC bytes in a frame resulting in an overhead of approximately 10-50%, assuming that messages usually fit in a single frame.

In some (constrained) implementations a lower layer assumes that a message that was initiated by a higher layer is also cryptographically protected by that higher layer, this in order to reduce the cryptographic overhead such as sending additional MICs.

Figure 4:
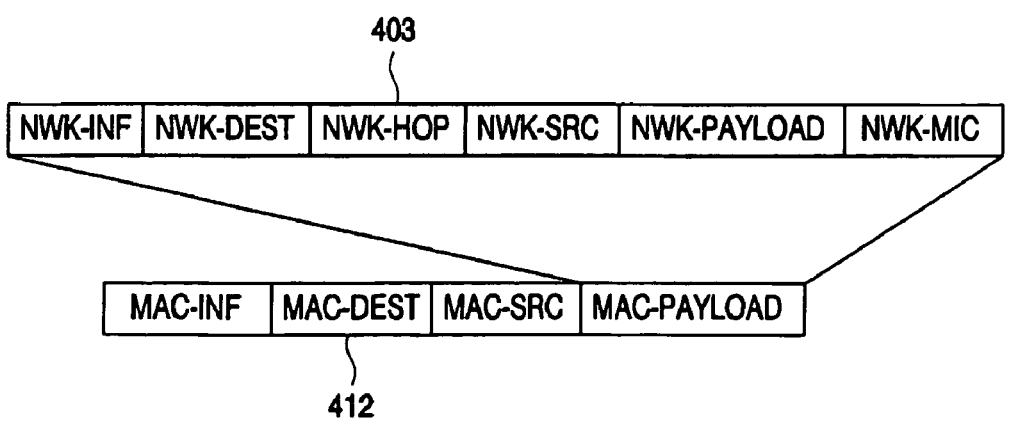
FIG. 4 shows that protection only at the initiating layer.

Using this approach based on the paradigm "the layer where the message is initiated takes care of cryptographic protection", there will be at most one MIC per message as shown in FIG. 4 for a message originating from the NWK layer. But this means that, in the example above, the NWK layer cannot rely on the MAC layer for cryptographic protection of NWK-HOP 403 (or, MAC-DEST 412).

However, the protected information should include the duplicated information which is to be omitted during transfer.

If the layer initiating the message still wants to protect the duplicated information using a MIC, it generates the MIC over all relevant information, including the duplicated information. After the MIC is computed, the duplicated information is removed from the frame and translated by an invertible mapping (for example a table look-up) to corresponding information at lower layers. When receiving the frame, the appropriate information from the lower layers is retrieved and translated to the appropriate information at the initiating layer by using the inverted mapping. This information is inserted into the frame at the appropriate place after which the MIC is verified.

As illustrated in FIG. 5, the NWK layer will compute the MIC over the whole frame 501 . . . 505, including NWK-HOP, in process step 550. Next, NWK-HOP is removed from the frame in process step 551, as symbolized by the cross 507 and sent to the MAC layer to be used as or to be translated into MAC-DEST. The receiving device's NWK layer translates MAC-DEST to NWK-HOP and inserts NWK-HOP in the frame before checking the NWK-MIC.

If the address information is not only omitted but also replaced by other information, such as described above, this other information could optionally also be protected by having the MIC over both the omitted and the replacement information.

This embodiment has the additional advantage that the cryptographic protection of the omitted information is maintained.

FIG. 6 shows a message from M1 650 via M2 651 to M3 652 in a multi-hop setting according to a traditional way of communication.

FIG. 7 shows a message from M1 650 via M2 651 to M3 652 in a multi-hop setting according to an embodiment of the invention. It shows that NWK-HOP is omitted by referring to MAC-DEST. The dashed lines and crosses 711 . . . 712 indicate that the fields are actually omitted to reduce the frame size. An additional advantage of this embodiment is that the NWK frame does not change on subsequent communications between hops, further possibly reducing processing overhead in the nodes.

An embodiment which achieves additional savings in frame size reduction is depicted in FIG. 8. In the first and last communication the fields NWK-SRC and NWK-DEST respectively are omitted too. At the cost of somewhat irregular processing, a further reduction of the communication size is obtained.

In a different embodiment the invention is applied recursively. FIG. 9 shows how fields in the application layer may refer to fields in the network layer, while these fields are possibly also omitted because they refer to fields at yet a lower layer.

In a further embodiment the addressing is not the same at each level. We show an example where the NWK layer uses the addresses of devices, but the APL layer addresses applications within these devices, for example by appending five bits to the device address 1001,1003. These bits specify one of the 32 applications within the addressed device. In this embodiment the address at the APL layer cannot be omitted completely, as these five bits are not available at a lower level. Only the prefixes of the fields 1001,1003 are duplicated at a lower layer. Therefore the fields 1010,1011 are not omitted but are replaced by shorter fields 1002,1004 as shown in FIG. 10.

Alternatives are possible. In the description above, "comprising" does not exclude other elements or steps, "a" or "an" does not exclude a plurality, and a single processor or other unit may also fulfill the functions of several means recited in the claims. Actual communication includes the actual communication between different devices or parts of a device, by means of optical, electronic, wireless, microwave, or any other suitable technology, or even communication between software components within a processing system or between processing systems.

The invention claimed is:

1. A transmitting method of transmitting data using a layered communication model, comprising the acts of:
   generating at a first layer a first communication fragment comprising a first address reference referring to a first entity,
   generating at a second layer below the first layer a second communication fragment based on the first communication fragment and further comprising a second address reference referring to a second entity which is related to the first entity,
   transmitting data comprising the second communication fragment,
   removing at least partly the first address reference in the transmitted data, and
   replacing the first address reference by an information field referring to the second address reference, wherein the first address reference is a hop count and wherein the second address reference is a MAC destination address.

2. The transmitting method according to claim 1, wherein cryptographic protection is provided for the first communication fragment before the first address reference is at least partly removed.

3. The transmitting method according to claim 2, wherein cryptographic protection is provided only at a single layer in the communication model.

4. The transmitting method according to claim 3, wherein the single layer equals the layer where the message was initiated.

5. A receiving method of receiving data using a layered communication model, comprising the acts of:
   receiving data comprising a second communication fragment, the second communication fragment comprising a second address reference referring to a second entity which is related to a first entity, being based on a first communication fragment comprising a first address reference to the first entity,
   retrieving the first communication fragment from the second communication fragment, characterized in that the first address reference is at least partly omitted in the received data, and
   restoring the first address reference in retrieving the first communication fragment, wherein the receiving method retrieves the first address reference using an information field in the received data which replaces the first address reference and refers to the second address reference; wherein the first address reference is a hop count and wherein the second address reference is a MAC destination address.

6. The receiving method according to claim 5, wherein cryptographic protection of the first communication fragment is verified after the first address reference is retrieved.

7. The receiving method according to claim 6, wherein cryptographic protection is provided only at a single layer in the communication model.

8. The receiving method according to claim 7, wherein the single layer equals the layer where the message was initiated.

9. A system for communication using a layered communication model, the system comprising
   transmitter means
      being arranged to generate at a first layer a first communication fragment comprising a first address reference referring to a first entity, and
      further being arranged to generate at a second layer below the first layer a second communication fragment based on the first communication fragment and further comprising a second address reference referring to a second entity which is related to the first entity,
   communication means
      being arranged to transmit data comprising the second communication fragment, and receiving means being arranged to receive data comprising the second communication fragment, and
      further being arranged to retrieve the first communication fragment from the second communication fragment,
   characterized in that
   the transmitter means is arranged to at least partly omit the first address reference from the transmitted data, and
   the receiving means is arranged to restore the first address reference in retrieving the first communication fragment from the received data, wherein the first address reference is a hop count and wherein the second address reference is a MAC destination address.

10. A transmitter device for transmitting data using a layered communication model, the transmitter device being arranged to
   generate at a first layer a first communication fragment comprising a first address reference referring to a first entity,
   generate at a second layer below the first layer a second communication fragment based on the first communication fragment and further comprising a second address reference referring to a second entity which is related to the first entity,
   transmit data comprising the second communication fragment,
   remove at least partly the first address reference in the transmitted data, and
   replace the first address reference by an information field referring to the second address reference, wherein the first address reference is a hop count and wherein the second address reference is a MAC destination address.

11. A receiver device f or receiving data using a layered communication model, the receiver device being arranged to
receive data comprising a second communication fragment,
the second communication fragment
comprising a second address reference referring to a second entity which is related to a first entity,
being based on a first communication fragment comprising a first address reference to the first entity, and
retrieve the first communication fragment from the second communication fragment, characterized in that
the first address reference is at least partly omitted in the received data,
restore the first address reference in retrieving the first communication fragment, and
retrieve the first address reference using an information field in the received data which replaces the first address reference and refers to the second address reference; wherein the first address reference is a hop count and wherein the second address reference is a MAC destination address.

12. A computer readable medium embodying a transmitter computer program product comprising instructions to implement communication using a layered communication model, the instructions when executed on a processor causing performance of the following acts of:
generating at a first layer a first communication fragment comprising a first address reference referring to a first entity,
generating at a second layer below the first layer a second communication fragment based on the first communication fragment and further comprising a second address reference referring to a second entity which is related to the first entity,
transmitting data comprising the second communication fragment, and
replacing the first address reference by an information field referring to the second address reference; wherein the first address reference is a hop count and wherein the second address reference is a MAC destination address.

13. A computer readable medium embodying a receiver computer program product comprising instructions to implement communication using a layered communication model, the instructions when executed on a processor causing performance of the following acts of:
receiving data comprising a second communication fragment,
the second communication fragment
comprising a second address reference referring to a second entity which is related to a first entity,
being based on a first communication fragment comprising a first address reference to the first entity, and
retrieving the first communication fragment from the second communication fragment,
the first address reference is at least partly omitted in the received data, and
the receiver computer program product is further arranged to restore the first address reference in retrieving the first communication fragment, wherein the instructions cause retrieval of the first address reference using an information field in the received data which replaces the first address reference and refers to the second address reference; wherein the first address reference is a hop count and wherein the second address reference is a MAC destination address.

* * * * *